US009826718B2

(12) United States Patent
Dewey

(10) Patent No.: US 9,826,718 B2
(45) Date of Patent: Nov. 28, 2017

(54) PET COLLAR WITH COLLAPSIBLE BOWL

(71) Applicant: ANIMAGANZA, LLC, Mukilteo, WA (US)

(72) Inventor: Alan J. Dewey, Marysville, WA (US)

(*) Notice: Subject to any disclaimer, the term of this patent is extended or adjusted under 35 U.S.C. 154(b) by 0 days.

(21) Appl. No.: 14/909,524

(22) PCT Filed: Jul. 22, 2014

(86) PCT No.: PCT/US2014/047702
§ 371 (c)(1),
(2) Date: Feb. 2, 2016

(87) PCT Pub. No.: WO2015/013337
PCT Pub. Date: Jan. 29, 2015

(65) Prior Publication Data
US 2016/0183497 A1 Jun. 30, 2016

Related U.S. Application Data

(60) Provisional application No. 61/856,880, filed on Jul. 22, 2013.

(51) Int. Cl.
A01K 7/00 (2006.01)
A01K 27/00 (2006.01)

(52) U.S. Cl.
CPC .......... A01K 27/008 (2013.01); A01K 27/001 (2013.01); A01K 7/00 (2013.01)

(58) Field of Classification Search
CPC ...... A01K 7/00; A01K 27/001; A01K 5/0121; A01K 27/00; A01K 5/00; A01K 7/005
USPC ........... 119/61.56, 858, 72, 61.5, 792, 61.57, 119/863, 864
See application file for complete search history.

(56) References Cited

U.S. PATENT DOCUMENTS

| 5,465,689 A * | 11/1995 | Winder ............... A01K 13/003 119/654 |
| 5,467,743 A * | 11/1995 | Doose ................. A01K 27/001 119/858 |
| 5,970,921 A * | 10/1999 | Fulton ................ A01K 13/006 119/792 |
| 6,016,772 A * | 1/2000 | Noyes ................ A01K 5/0114 119/61.56 |
| D423,150 S * | 4/2000 | Vignere .................... D30/145 |

(Continued)

FOREIGN PATENT DOCUMENTS

WO WO2015013337 A2 10/2015

OTHER PUBLICATIONS

CraftStylish. How to Make a Collapsible Travel Dish for Your Pet. Retrieved from the internet <URL:http://www.craftstylish.com/item/41093/how-to-make-a-collapsible-travel-dish-for-your-pet>, Feb. 6, 2009.

Primary Examiner — Yvonne Abbott-Lewis
(74) Attorney, Agent, or Firm — Nathaniel A. Gilder; Jensen & Puntigam, PS

(57) ABSTRACT

A wearable collar device having an integrated collapsible bowl for containing water, food, treats and the like. The device can also be used to carry keys, bags, etc. The bowl is flattened during storage and use and can be expanded to contain liquids. The collar includes a body and a pair of opposed elongated ends adapted to be tied around a pet's neck. The ends allow the collar to accommodate a range of neck sizes. The bowl is defined by a sheet of material folded in a unique manner. The fold lines allow the bowl to be collapsed into a consistently flat form.

15 Claims, 5 Drawing Sheets

(56) References Cited

U.S. PATENT DOCUMENTS

| | | | | |
|---|---|---|---|---|
| 6,209,140 | B1* | 4/2001 | Ebeling | A01K 13/006 |
| | | | | 119/792 |
| 6,516,748 | B1* | 2/2003 | Jackson | A01K 27/006 |
| | | | | 119/72 |
| 6,523,182 | B1* | 2/2003 | Brawner | A01K 13/006 |
| | | | | 2/207 |
| 6,763,785 | B1* | 7/2004 | Grady | A01K 27/00 |
| | | | | 119/858 |
| 7,063,045 | B2* | 6/2006 | Van Meter | A01K 27/006 |
| | | | | 119/795 |
| 7,427,417 | B2* | 9/2008 | Jendrucko | A61K 8/02 |
| | | | | 424/725 |
| 8,613,262 | B1* | 12/2013 | Mergard | A01K 7/00 |
| | | | | 119/72 |
| 8,960,125 | B1* | 2/2015 | Brown | A01K 7/00 |
| | | | | 119/72 |
| 9,010,565 | B2* | 4/2015 | Warner | A01K 7/00 |
| | | | | 206/545 |
| 9,288,966 | B2* | 3/2016 | Penn | A01K 5/0114 |
| 9,560,835 | B1* | 2/2017 | Bastone, Jr. | A01K 7/005 |
| 2002/0066413 | A1* | 6/2002 | Prezant | A01K 5/0114 |
| | | | | 119/61.57 |
| 2006/0027178 | A1* | 2/2006 | Stephens | A01K 5/0121 |
| | | | | 119/61.56 |
| 2006/0065201 | A1* | 3/2006 | Cogliano | A01K 27/006 |
| | | | | 119/61.56 |
| 2007/0163507 | A1* | 7/2007 | Lynch | A01K 5/0114 |
| | | | | 119/61.56 |
| 2009/0199776 | A1* | 8/2009 | Alexander | A01K 7/06 |
| | | | | 119/61.56 |
| 2010/0050949 | A1* | 3/2010 | Hsieh | A01K 5/0114 |
| | | | | 119/61.56 |

* cited by examiner

PET COLLAR WITH COLLAPSIBLE BOWL

TECHNICAL FIELD

The invention is directed to the field of pet accessories. More specifically, the application relates to a neck-wearable device including a collapsible bowl for containing water, food, treats, bags, keys and the like.

SUMMARY OF THE INVENTION

The present invention provides a wearable device having an integrated collapsible bowl for containing water, food, treats and the like. The device can also be used to carry keys, bags, etc. The device is intended to be worn by dogs, although other animal uses are envisioned.

The present invention provides a relatively flat collar having an integrated collapsible bowl. The bowl is preferably made of waterproofed fabric so that the bowl can contain a liquid once expanded into a bowl-form. The collar includes a body and a pair of opposed elongated ends adapted to be tied around a pet's neck. The ends allow the collar to accommodate a range of neck sizes.

In one embodiment of the invention, the fabric or sheet bowl is defined by a single sheet of fabric or sheet material which is folded in a unique manner. In one embodiment, the fold lines are relatively distinct fold lines in a fluid impervious fabric material allowing the bowl to be collapsed into a flat form. The fold lines importantly allow the sheet bowl to be returned to a flattened state in a consistent manner by preventing bunching of material, etc. The fabric or sheet bowl may be formed by folding a sheet of waterproofed fabric in a predetermined pattern to define a plurality of panels. The fabric bowl preferably can be repeatedly expanded into bowl form for use and subsequently collapsed into a consistent flat form for storage or use.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
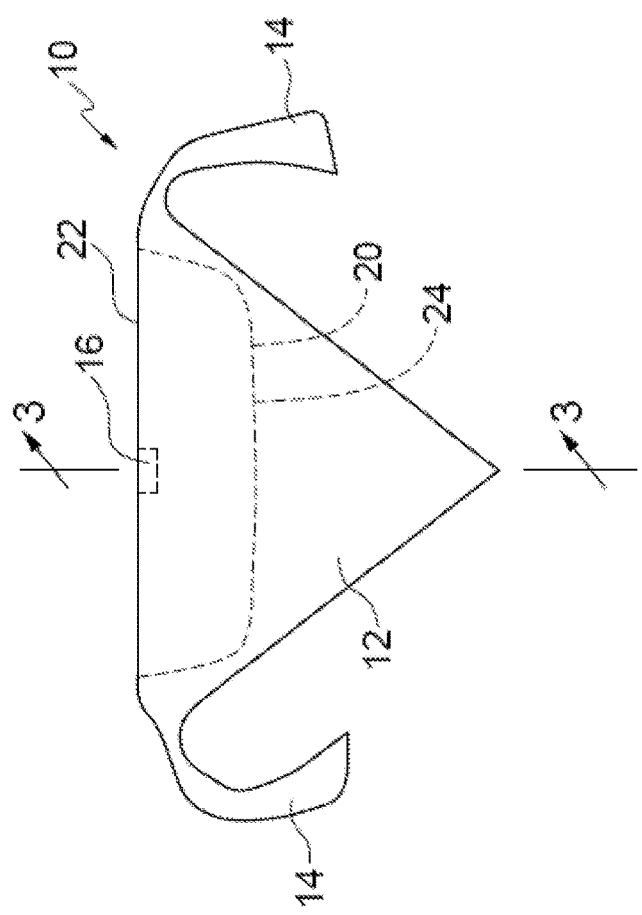
FIG. 1 is a perspective view of a collar bowl of the present invention.
Figure 2:
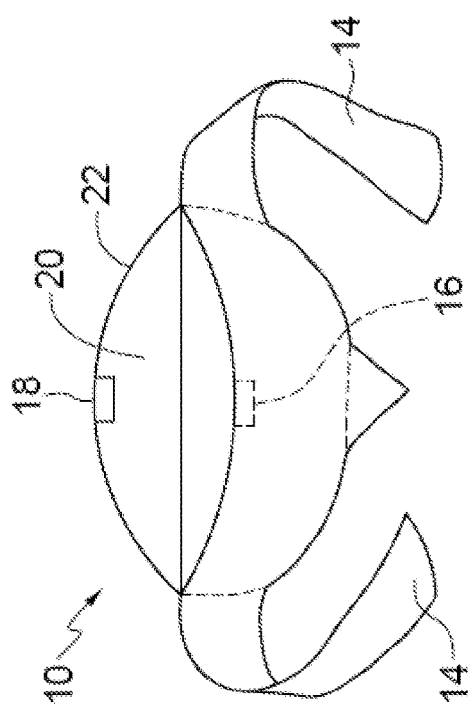
FIG. 2 is a plan view of the collar bowl of FIG. 1.

Referring to the drawings, a wearable device is shown in FIGS. 1 and 2 and designed numeral 10. Device 10 is defined as a generally triangular body 12 having a pair of opposed elongated ends 14. Ends 14 are adapted to be tied around a neck of the pet. A collapsible bowl 20 is included within body 12. Bowl 20 has an open top 22 and closed bottom 24 (shown in FIG. 3).

Body 12 is preferably formed of washable fabric panels. A variety of fabrics or other flexible sheet-like materials can be used to fabricate body 12. Body 12 includes a pair of fabric sheets which are sewn together to define a pair of sides. A single sheet of fabric could also be used to form body 12. A plurality of different fabric materials could be utilized to fabricate body 12. The fabric materials can be sewn or adhered together. Body 12 may define a plurality of different sizes. For example, body 12 can be made in large, medium and small sizes to accommodate different pet sizes. A hook and loop fastener 16, 18 is used to secure sides of the body together at open end 22. Alternative fasteners may be practicable to secure the sides together, including but not limited to zippers, snaps or multiple hook and loop fasteners.

Figure 3:
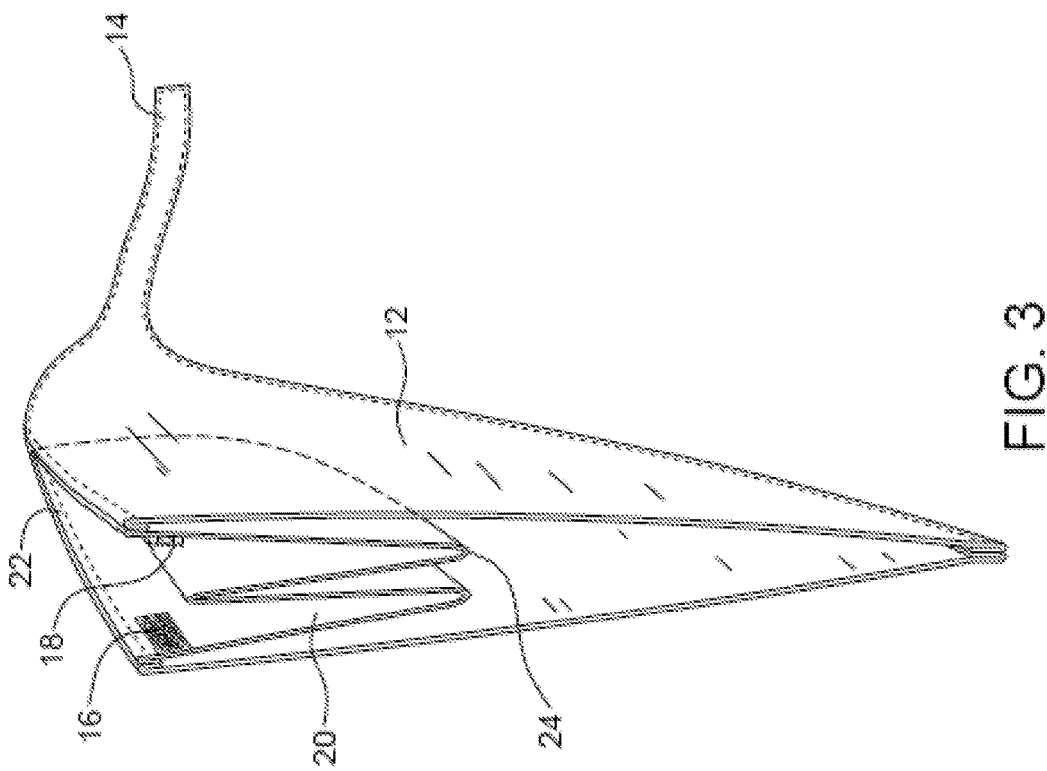
FIG. 3 is a cross sectional view of FIG. 1 taken along lines 3-3.
Figure 4:
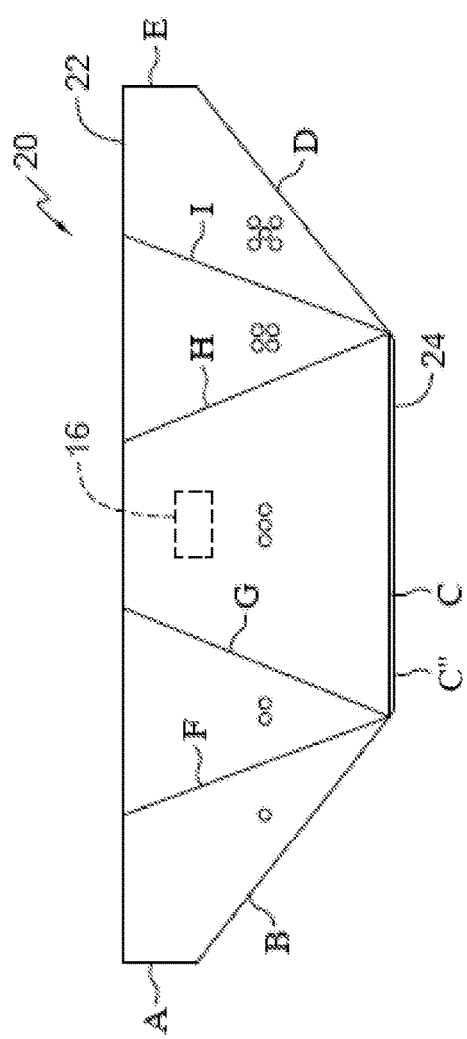
FIG. 4 is a plan view of the bowl exterior of FIG. 1.
Figure 5:
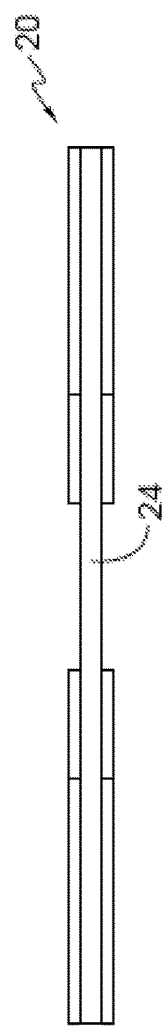
FIG. 5 is a bottom view of the bowl of FIG. 4.

FIG. 3 is a cross-sectional view of the device 10 of FIG. 1. The bowl 20 includes a plurality of folded panels. FIG. 4 is a side view of the exterior of the folded bowl 20 (as depicted removed from the device 10 of FIG. 1). FIG. 5 is a bottom view of the folded bowl 20 of FIG. 4.

Figure 6:
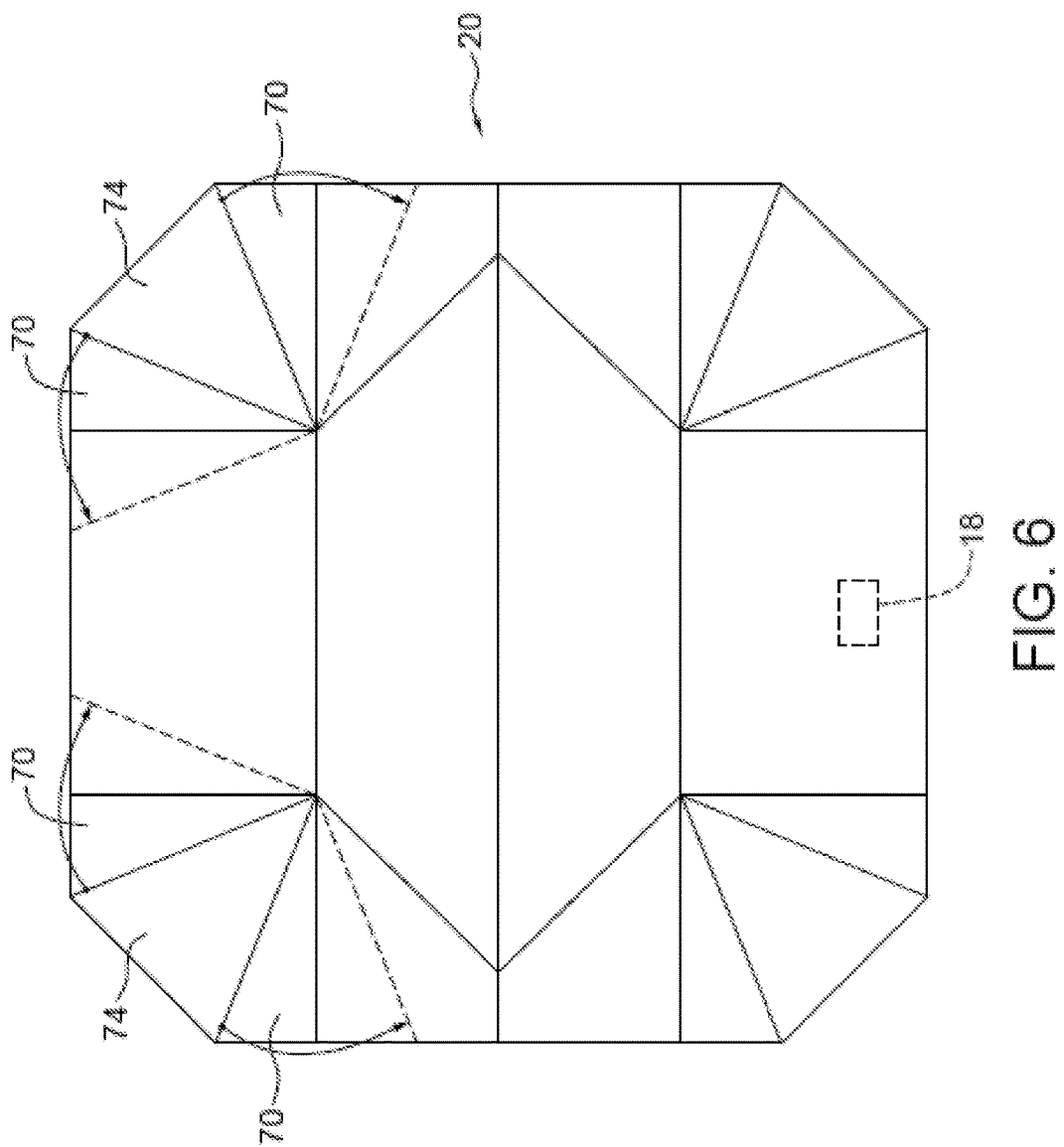
FIG. 6 is a view of the unfolded sheet defining the bowl of FIG. 1.

FIG. 6 is the fabric sheet used to form bowl 20 of FIG. 4. The sheet 20 is a clipped-corner square shape. The bowl sheet is preferably a waterproofed fabric, such as coated nylon. For example, bowl sheet 20 may be a PVC-backed nylon taffeta material. Other sheet materials may also be used to form bowl 20. The sheet is folded in a unique manner to define bowl 20. The fold lines may be heat-pressed to define relatively crisp fold lines in the fabric material. As used herein, the term "fabric" includes traditional fiber fabric materials and fluid impervious sheets, such as mylar, polyethylene, etc. Bowl 20 is folded along fold lines (A-W) (see FIG. 7) to define a plurality of different panels.

A plurality of hidden panels 70 are defined when the panels are folded and formed into the shape shown in FIG. 4. The hidden panels 70 are covered by panels 74 when the bowl sheet is folded into form.

Figure 7:
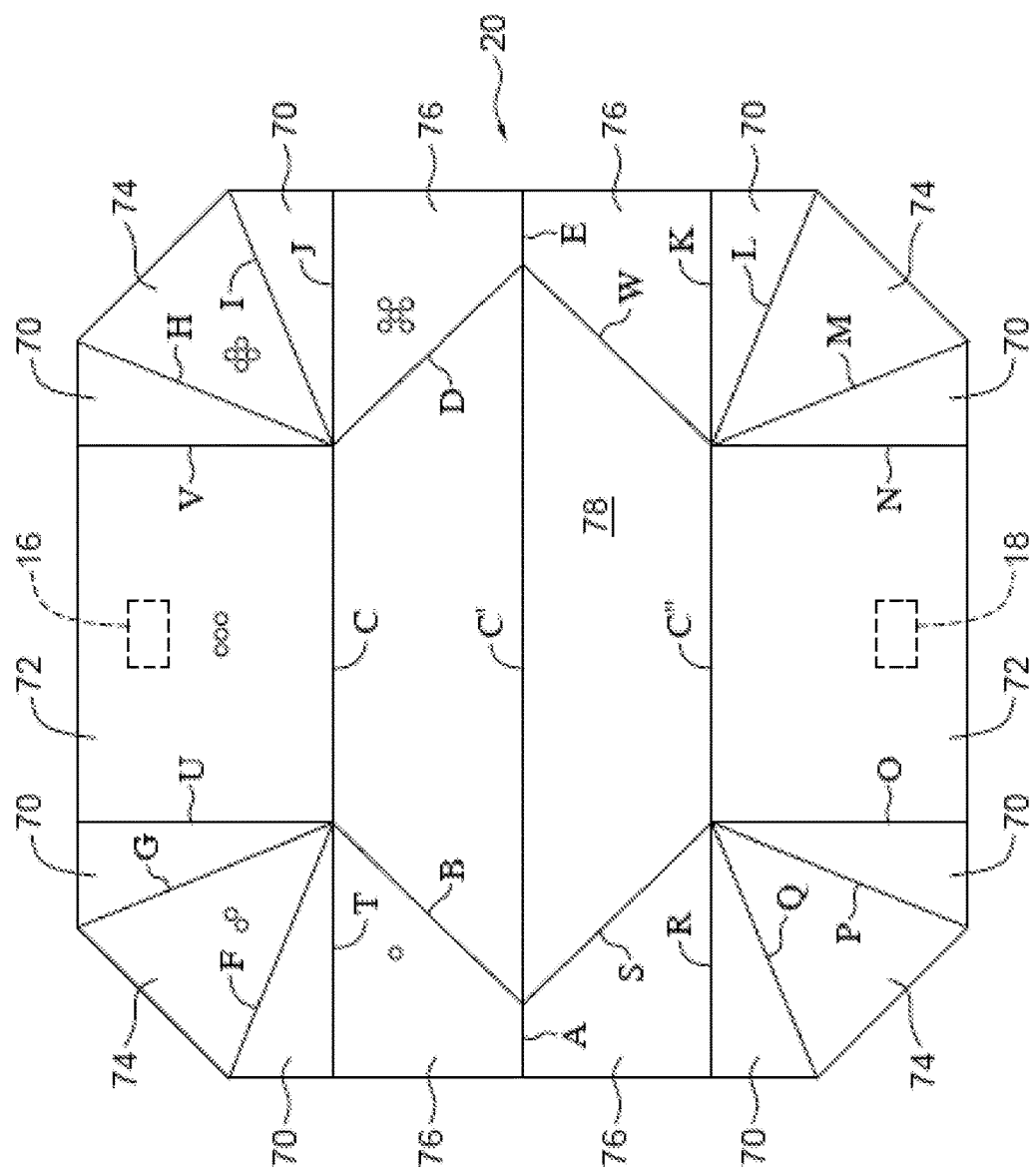
FIG. 7 is a view of the unfolded sheet defining the bowl of FIG. 1.

FIG. 7 is another view of the fabric sheet used to form bowl 20 of FIG. 4. The characters (A-I) shown in FIG. 7 correspond to the characters (A-I) shown in FIG. 4. The panels define a plurality of shapes, including right triangle panels 70, rectangle panels 72, isosceles triangle panels 74, clipped right triangle panels 76, and central hexagon panel 78. Central hexagon panel 78 includes a central fold line and is folded in half. The rectangular panels 72 are positioned on either side of hexagon panel 78.

Hexagon panel 78 flattens out when the bowl is opened to provide a stable bowl base. The bowl fold pattern thus allows for a simple clean fold when closed and more stable bowl shape when opened. The fold pattern allows the various panels 70, 72, 74, 76, 78 to fold flat when closed as shown in FIGS. 4 and 5. The bowl sheet 20 is generally fan-folded, with various panels being folded over along fold lines (A-W). Panels 70 are "hidden" panels and are covered by panels 74 when the sheet 20 is folded into form.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A collar device comprising:
a collar body having a pair of opposed elongated ends, said ends being securable together to secure the collar body around a neck of a pet; and
a foldable fabric sheet secured to the collar body, said fabric sheet including a plurality of panels being defined along fold lines, and said fabric sheet adapted to be repeatedly collapsed and expanded along the fold lines between a flattened form and a stable base bowl form, with said bowl form adapted to contain a volume of liquid;
wherein the plurality of panels of said fabric sheet include:
a central hexagonal panel separating a pair of rectangular panels, wherein the central hexagonal panel forms a stable base of said bowl form, and wherein the pair of rectangular panels form sides of the bowl form;
wherein the central hexagonal panel is foldable in half along a central fold line and the pair of rectangular panels are foldable along a pair of fold lines laterally spaced from the central fold line, with the central hexagonal panel and pair of rectangular panels being fan-foldable along the fold lines; and
a plurality of triangular panels adjacent opposite ends of each rectangular panel of the pair of rectangular panels, wherein each plurality of triangular panels is foldable to form a corner of the bowl form.

2. The collar device of claim 1 wherein the fabric sheet is defined by a single sheet of fluid impervious material.

3. The collar device of claim 1 further comprising a closure mechanism for securing sides of the fabric body together.

4. The collar device of claim 3 wherein the closure mechanism includes one or more of a hook and loop fastener, a zipper, or a snap.

5. The collar device of claim 1 wherein the plurality of panels includes a plurality of clipped right triangular panels defined by fold lines generally parallel to the central fold line and fold lines angled away from the central fold line, with said clipped right triangular panels being adjacent opposite ends of the central hexagonal panel, wherein said clipped right triangular panels form sides of the bowl form.

6. The collar device of claim 1 wherein each plurality of triangular panels comprises an isosceles triangle panel, with each isosceles triangle panel separating a pair of right triangular panels, and with one of said pair of right triangular panels being adjacent one of the rectangular panels and the other one of said pair of right triangular panels being adjacent a clipped right triangular panel.

7. The collar device of claim 6, wherein the isosceles triangle shaped panels are folded over the adjacent right triangular panels thereby hiding the right triangular panels from view in order to form the bowl form.

8. The collar device of claim 1 wherein the fabric sheet is a clipped-corner square form.

9. A method of using a collar device having a flattened form and a stable base bowl form, the method comprising:
removing the collar device from a neck of a pet, the collar device comprising:
a collar body having a pair of opposed elongated ends, said ends being securable together to secure the collar body around the neck of the pet; and
a foldable fabric sheet secured to the collar body, said fabric sheet including a plurality of panels being defined along fold lines, and said fabric sheet adapted to be repeatedly collapsed and expanded along the fold lines between the flattened form and the bowl form, with said bowl form adapted to contain a volume of liquid;
wherein the plurality of panels of said fabric sheet include:
a central hexagonal panel separating a pair of rectangular panels, wherein the central hexagonal panel forms a stable base of said bowl form, and wherein the pair of rectangular panels form sides of the bowl form;
wherein the central hexagonal panel is foldable in half along a central fold line and the pair of rectangular panels are foldable along a pair of fold lines laterally spaced from the central fold line, with the central hexagonal panel and pair of rectangular panels being fan-foldable along the fold lines; and
a plurality of triangular panels adjacent opposite ends of each rectangular panel of the pair of rectangular panels, wherein each plurality of triangular panels is foldable to form a corner of the bowl form; and
expanding the folded fabric sheet to define a container for liquid for pet consumption.

10. The method of claim 9, further comprising, after pet consumption of the liquid, folding the fabric sheet along its fold lines in order to return the collar device to the flattened form.

11. The method of claim 10, further comprising securing the collar device around the neck of the pet after returning the collar device to the flattened form.

12. The collar device of claim 1, wherein the pair of opposed elongated ends of the collar body comprise fabric, and wherein the pair of opposed elongated ends are tied together to secure the collar body around the neck of the pet.

13. The collar device of claim 1, wherein the collar body comprises a pair of sheets of fabric which are sewn or adhered together, and wherein said fabric body is positioned between said pair of sheets of fabric.

14. The collar device of claim 1, wherein the fabric sheet comprises a coated nylon material.

15. The collar device of claim 1, wherein the fabric sheet comprises one or more of a PVC backed nylon taffeta material, a mylar material, or a polyethylene material.

\* \* \* \* \*